E. J. MITCHELL.
AUTOMOBILE TIRE.
APPLICATION FILED SEPT. 10, 1912.
1,149,459.
Patented Aug. 10, 1915.
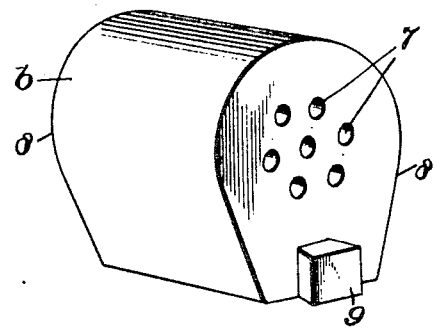
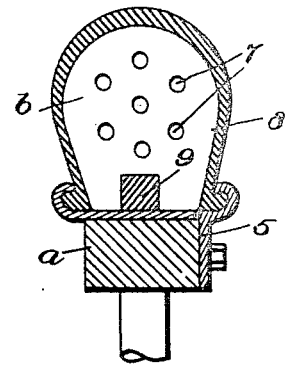
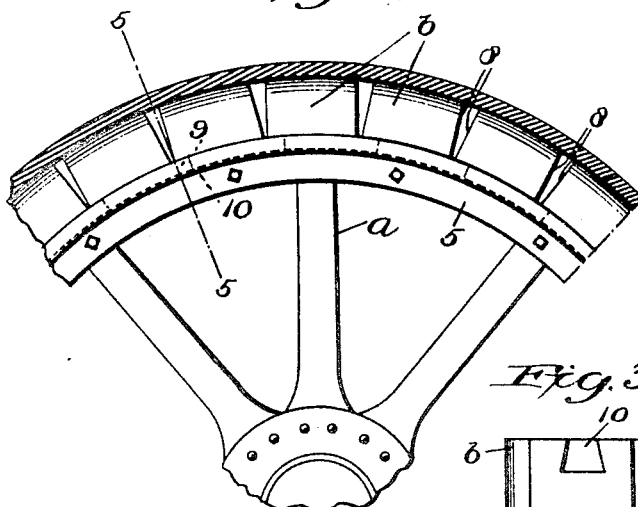
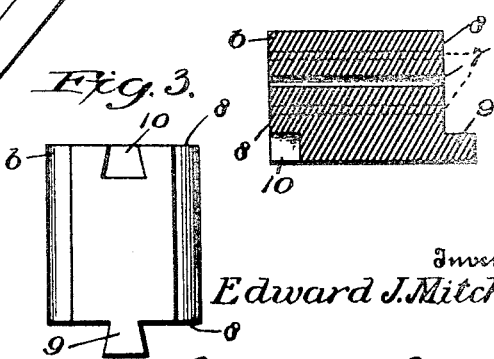
Inventor
Edward J. Mitchell
By Victor J. Evans
Attorney
Witnesses:
C. James Cronin
M. E. Laughlin

UNITED STATES PATENT OFFICE.

EDWARD J. MITCHELL, OF BROOKLYN, NEW YORK.

AUTOMOBILE-TIRE.

1,149,459.  Specification of Letters Patent.  Patented Aug. 10, 1915.

Application filed September 10, 1912. Serial No. 719,598.

*To all whom it may concern:*

Be it known that I, EDWARD J. MITCHELL, a citizen of the United States, residing at Brooklyn, in the county of Kings and State of New York, have invented new and useful Improvements in Automobile-Tires, of which the following is a specification.

The general object of the invention is to refine, simplify and increase the effectiveness of the locking parts of sectional rubber tires. And to this end the invention consists in providing a tongue and groove connection for the adjacent ends of the tire sections.

Other objects will appear and be better understood from that embodiment of my invention of which the following is a specification, reference being had to the accompanying drawings forming part hereof, and in which:

Figure 1 is a perspective of a fillet or tire section constructed in accordance with my invention. Fig. 2 is a side elevation showing a fragment of a wheel with my improved tire applied thereto. Fig. 3 is a bottom plan of Fig. 1. Fig. 4 is a vertical longitudinal section. Fig. 5 is a vertical cross section on the line 5—5 of Fig. 2.

The wheel, which is designated generally by (*a*) has a demountable rim 5 of ordinary or preferred construction. The sections (*b*) may be of any material found suitable for the purpose, as rubber and if so desired, they may have longitudinal bores 7 to increase their resiliency. The sections may, if so desired, be substantially cylindrical in cross section so as to provide a round tread surface or the sections may be in any other cross sectional contour according to the shape of tread surface desired. By preference the ends 8—8 of the sections are parallel and each section is formed on one end with a dovetailed rib or stud 9, and on its opposite end, with a dovetailed groove or socket 10 which opens through the bottom of the section and through the end wall. By constructing the said sections as just described and arranging them in the rim 5 so that the groove of each section will receive the rib of the adjacent section, each of the several sections will be locked against independent endwise movement and consequent displacement.

With the tire constructed as just described the usual tire shoe is employed to cover the sections and this shoe is interlocked with the rim in the ordinary manner. The several sections are assembled by arranging one section on the rim and introducing the grooved end of a second section to the ribbed end of the first section, the subsequent sections are similarly connected; and when the grooved end of the last section is connected, the grooved end of the first section is sprung upwardly so as to admit of properly positioning the ribbed end of the last section, and this done, the sprung end is released and descends into the rib.

With the tire constructed in accordance with this invention, any of the sections thereof showing wear, may be readily removed and new sections substituted, thus making it unnecessary to discard the entire tire.

What I claim as new is:

In combination with a wheel rim, a tire comprising sections of resilient material having ends which are normally parallel, said sections being rounded transversely at their outer sides and being normally flat at their inner sides, said sections having longitudinal bores located at their central portions, the passageways through which are unobstructed from end to end of the sections, each section having at one end a wedge-shaped stud one side of which is in the same plane as the flat side of the section, each section having at its other end a wedge-shaped socket which opens at one side of the flat side of the section and which terminates short of the center of the section, the stud of one section fitting snugly into the socket of the next adjacent section, and the flat sides of the sections bearing against the wheel rim, whereby the studs are held by the rim in the socket and the sections are joined together at their innermost portions only and the portions of the sections having the bores are spaced from each other, and a cover inclosing the sections and connected at its edges with the wheel rim and bridging the spaces between the sections and thereby confining a plenum of air between the sections and in the bores thereof, the parts being so arranged that when the tire is compressed at one point the air within the cover is maintained at the same degree of pressure at the opposite ends of all of the sections.

In testimony whereof I affix my signature in presence of two witnesses.

EDWARD J. MITCHELL.

Witnesses:
JOHN A. MORGAN,
GEO. T. BYRNE.